United States Patent
Kim et al.

(10) Patent No.: US 7,649,586 B2
(45) Date of Patent: Jan. 19, 2010

(54) DISPLAY DEVICE WITH FLOATING TRANSISTOR ELEMENTS ON ALTERNATING DATA LINES

(75) Inventors: Jeong-Il Kim, Gwangycock-si (KR); Jong-Woong Chang, Suwon-si (KR); Seung-Soo Baek, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 284 days.

(21) Appl. No.: 11/197,356

(22) Filed: Aug. 5, 2005

(65) Prior Publication Data

US 2006/0033857 A1    Feb. 16, 2006

(30) Foreign Application Priority Data

Aug. 16, 2004    (KR) ...................... 10-2004-0062153

(51) Int. Cl.
*G02F 1/13* (2006.01)
*G02F 1/1333* (2006.01)
*G01R 31/00* (2006.01)

(52) U.S. Cl. ........................... 349/54; 349/40; 349/192; 324/770

(58) Field of Classification Search ................... 349/40, 349/54, 55, 192, 149; 324/770
See application file for complete search history.

(56) References Cited

U.S. PATENT DOCUMENTS

| | | | | |
|---|---|---|---|---|
| 5,909,035 A * | 6/1999 | Kim | ............................. | 257/59 |
| 6,081,307 A * | 6/2000 | Ha | ............................... | 349/40 |
| 6,411,351 B1 * | 6/2002 | Zhang et al. | .................. | 349/54 |
| 6,919,931 B2 * | 7/2005 | Chae | ............................ | 349/40 |
| 2003/0160907 A1 * | 8/2003 | Kweon et al. | ................. | 349/40 |
| 2004/0032544 A1 * | 2/2004 | Kim et al. | ..................... | 349/40 |
| 2004/0124869 A1 * | 7/2004 | Lee et al. | ..................... | 324/770 |
| 2004/0125256 A1 * | 7/2004 | Park et al. | ..................... | 349/43 |
| 2004/0263719 A1 * | 12/2004 | Inoue et al. | .................. | 349/93 |
| 2005/0200768 A1 * | 9/2005 | Lim | ............................. | 349/40 |

* cited by examiner

*Primary Examiner*—David Nelms
*Assistant Examiner*—Jessica M Merlin
(74) *Attorney, Agent, or Firm*—Innovations Counsel LLP (57) ABSTRACT

A panel for a display device includes a shorting bar to dissipate an electrostatic charge and the first and second testing bars. Signal lines are divided into the first signal line group electrically connected to the first testing bar and the second signal line group electrically connected to the second testing bar. Floating transistors are formed between the shorting bar and the signal lines of the second signal line group.

22 Claims, 11 Drawing Sheets

DISPLAY DEVICE WITH FLOATING TRANSISTOR ELEMENTS ON ALTERNATING DATA LINES

CROSS-REFERENCE TO RELATED APPLICATION

This application relies for priority upon Korean Patent Application No. 2004-62153 filed on Aug. 6, 2004, the contents of which are herein incorporated by reference in its entirety.

BACKGROUND OF THE INVENTION

1. Field of the Invention

The present invention relates to a display panel, particularly, to a display panel substrate for preventing a test error and a method of manufacturing the substrate.

2. Description of the Related Art

Generally, a liquid crystal display (LCD) panel includes an array substrate, a counter substrate and a liquid crystal layer interposed therebetween, and is divided into a pixel region and an interface region. Data lines, scan lines (i.e. gate lines), switching elements and pixel electrodes are arranged on the array substrate in the pixel region. Data pads and gate pads are arranged on the array substrate in the interface region and receive data signals and scan signals from data driver chips and scan drivers chip, respectively.

Upon completing fabrication of the array substrates formed on a mother substrate, an array testing and a visual inspection (V/I) are performed. The array testing performs testing of the lines on the array substrate, and a visual inspection (V/I) performs electrical and optical testing of the array substrate. In general, the pads for the array test are arranged outside the cutting line of the mother substrate, the pads for the V/I are arranged inside the cutting line, and the lines for the array test and the V/I are inside the cutting line.

When the array test is completed, the mother substrate is cut along the cutting line, and then the V/I is performed. The array test and the V/I are performed by a testing method such as a 2G2D method, a 2G3D method, etc. In the 2G2D method, two different signals are applied to the scan lines, and two different signals are applied to the data lines. In the 2G3D method, two different signals are applied to the gate lines, and three different signals are applied to the data lines.

SUMMARY OF THE INVENTION

The present invention discloses a panel for a display device, which is less prone to the testing errors, and a method for manufacturing the same In one aspect of the present invention, a panel for a display device includes a shorting bar to dissipate an electrostatic charge and the first and second testing bars. Signal lines are divided into the first signal line group electrically connected to the first testing bar and the second signal line group electrically connected to the second testing bar. Floating transistors are formed between the shorting bar and the signal lines of the second signal line group.

In another aspect of the present invention, a method of manufacturing a panel for a display device is disclosed. The first conductive pattern is formed on a substrate and comprises an electrically floating gate electrode, the first testing line. The first insulation layer is formed on the first conductive pattern. The second conductive pattern is formed on the first insulation layer and comprises a shorting bar, a source electrode connected to the second shorting bar, a drain electrode, a data line connected to the drain electrode. The electrically floating gate electrode, the source electrode and the drain electrode form a transistor. The second insulating layer is formed over the second conductive pattern. The first contact hole is formed via the first insulation layer and the second insulation layer to expose the second shorting bar. The second contact hole is formed via the second insulation layer to expose the data line. The third conductive pattern is formed on the second insulating layer and comprises a contact portion electrically interconnecting the second shorting bar and the data line via the first contact hole and the second contact hole.

BRIEF DESCRIPTION OF THE DRAWINGS

The above and other advantages of the present invention will become more apparent by describing in detail exemplary embodiments thereof with reference to the accompanying drawings.

DETAILED DESCRIPTION OF THE INVENTION

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

Figure 1:
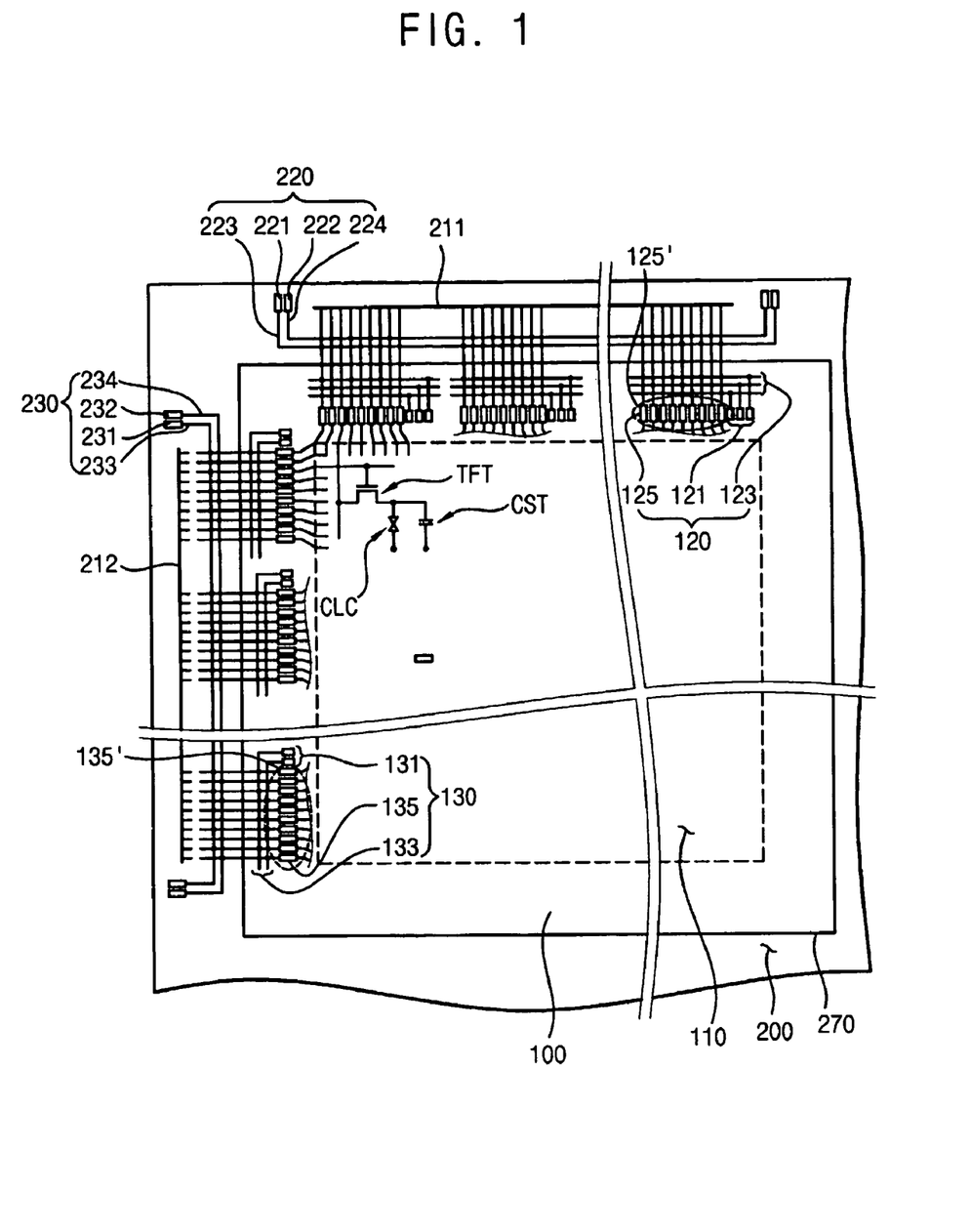
FIG. 1 is a plane view illustrating a substrate of a display panel according to one embodiment of the present invention.

FIG. 1 is a plane view illustrating an array substrate 100 for a display device according to an embodiment of the present invention. On the array substrate 100, the first shorting bar 211, the second shorting bar 212, the first array test part 220, the second array test part 230 and a scribe line 270 are formed. A mother substrate (not shown) may include more than one array substrate 100. Each of the array substrates 100 includes a first visual inspection (V/I) part 120 and a second V/I part 130. Data lines, scan lines, switching elements, pixel electrodes are arranged in the pixel region 110. Each switching element is electrically connected to the corresponding data and scan lines. Each pixel electrode is electrically connected to the corresponding switching element.

The first V/I part 120 includes the first V/I pads 121, the first V/I lines 123 and the first drive chip pads 125. The first driver chip (not shown) is arranged on the first driver chip pads 125. The data lines are grouped as the first drive chip pad assembly 125'. Alternatively, the data lines can be divided into several first drive chip pad assemblies. The first driver chip pad assembly 125' is electrically connected to the first V/I pads 121 and the first V/I lines 123. The first V/I pads 121 include the first V/I data pad, the second V/I data pad, and the third V/I data portion using a 3D method. In the 3D method, the first, second, and third V/I data pad are connected to the (3n−2)th data lines, the (3n−1)th data lines, and the (3n)th data lines, respectively, wherein 'n' is a natural number.

The second V/I part 130 includes the second V/I pads 131, the second V/I lines 133 and the second drive chip pads 135. The second driver chip (not shown) is arranged on the second driver chip pads 135. The scan lines are grouped as the second driver chip pad assembly 135'. Alternatively, the scan lines may be grouped into a plurality of the second driver chip pad assemblies. The second V/I pads 131 include the first V/I scan pad and a second V/I scan pad using a 2G method, and the first and second V/I scan pad are electrically connected to the (2n−1)th scan lines and the (2n)th scan lines, wherein 'n' is a natural number.

The first shorting bar 211 is electrically connected to the data lines to dissipate an electrostatic charge stored in the array substrate 100 through the data lines. The static charge may be generated during the manufacturing steps (e.g. a plasma enhanced chemical vapor deposition (PECVD), a sputtering deposition, etc.) and stored in the array substrate 100. The first shorting bar 211 is a single line disposed on a peripheral portion of the array substrate 100. The first shorting bar 211 is extended substantially in parallel with the scan lines.

The second shorting bar 212 is electrically connected to the scan lines to dissipate the electrostatic charge stored in the array substrate 100 through the scan lines. The electrostatic charge may be stored in the array substrate 100 during the manufacturing process of the array is substrate 100. The second shorting bar 212 is a single line disposed on a peripheral portion of the array substrate 100. The second shorting bar 212 is extended substantially in parallel with the data lines.

The first array test part 220 applies the first data test signal and the second data test signal to the data lines. The first array test part 220 includes two data test pads (i.e. first data test pad 221 and second data test pad 222), two data test lines (i.e. the first data test line 223 and the second data test line 224) and a plurality of floating thin film transistors (TFTs). A 2D method is used for the first data test pad 221 and the second data test pad 222. In the 2D method, two different data test signals are applied to the data lines. The data test pad 221 applies the first data test signal to the odd numbered data lines and the second data test pad 222 applies the second data test signal to the even numbered data lines. The data test lines 223 and 224 include a first data test line 223 and a second data test line 224 using the 2D method. The first data test line 223 is connected to the odd numbered data lines, and the second data test line 224 is connected to the even numbered data lines. The floating TFTs are arranged on the even numbered data lines (or the odd numbered data lines) between the first and second data test lines 223 and 224 and the first shorting bar 211.

The first data test signal applied the odd numbered data lines is not applied to the even numbered data lines. Each of the floating TFTs controls the first data test signal. In the substrate of FIG. 1, the floating TFTs disposed on the even numbered data lines block the first data test signal. The even numbered data lines are floated with respect to the first data test signal by the floating TFTs. The even numbered data lines are electrically disconnected from the first shorting bar 211 by the floating TFTs. The first data test signal is applied to the odd numbered data lines. An etching process to electrically insulate the first shorting bar 211 from the data lines is unnecessary. Therefore, the array test error that may be occurred by the etch process is prevented.

The second array test part 230 applies scan test signals to the scan lines. The second array test part 230 includes scan test pads (i.e. first scan test pad 231 and second scan test pad 232) and scan test lines 233 and 234 (i.e. first scan test line 233 and second scan test line 234). The first scan test signal is applied to the first and second scan test pads 231 and 232 using a 2G method. In the 2G method, two different scan test signals are applied to the scan lines. The first scan test pad 231 applies the first scan test signal to the odd numbered scan lines, and the second scan test pad 232 applies the second scan test signal to the even numbered scan lines. The first scan test line 233 is electrically connected to the odd numbered scan lines, and the second scan test line 234 is electrically connected to the even numbered scan lines.

The scan lines between the scan test lines 233 and 234 and the second shorting bar 212 are etched so that the scan lines between the scan test lines 233 and 234 and the second shorting bar 212 are partially opened to test the scan lines. Therefore, the etching process prevents error of the array test using the 2G method.

Figure 2:
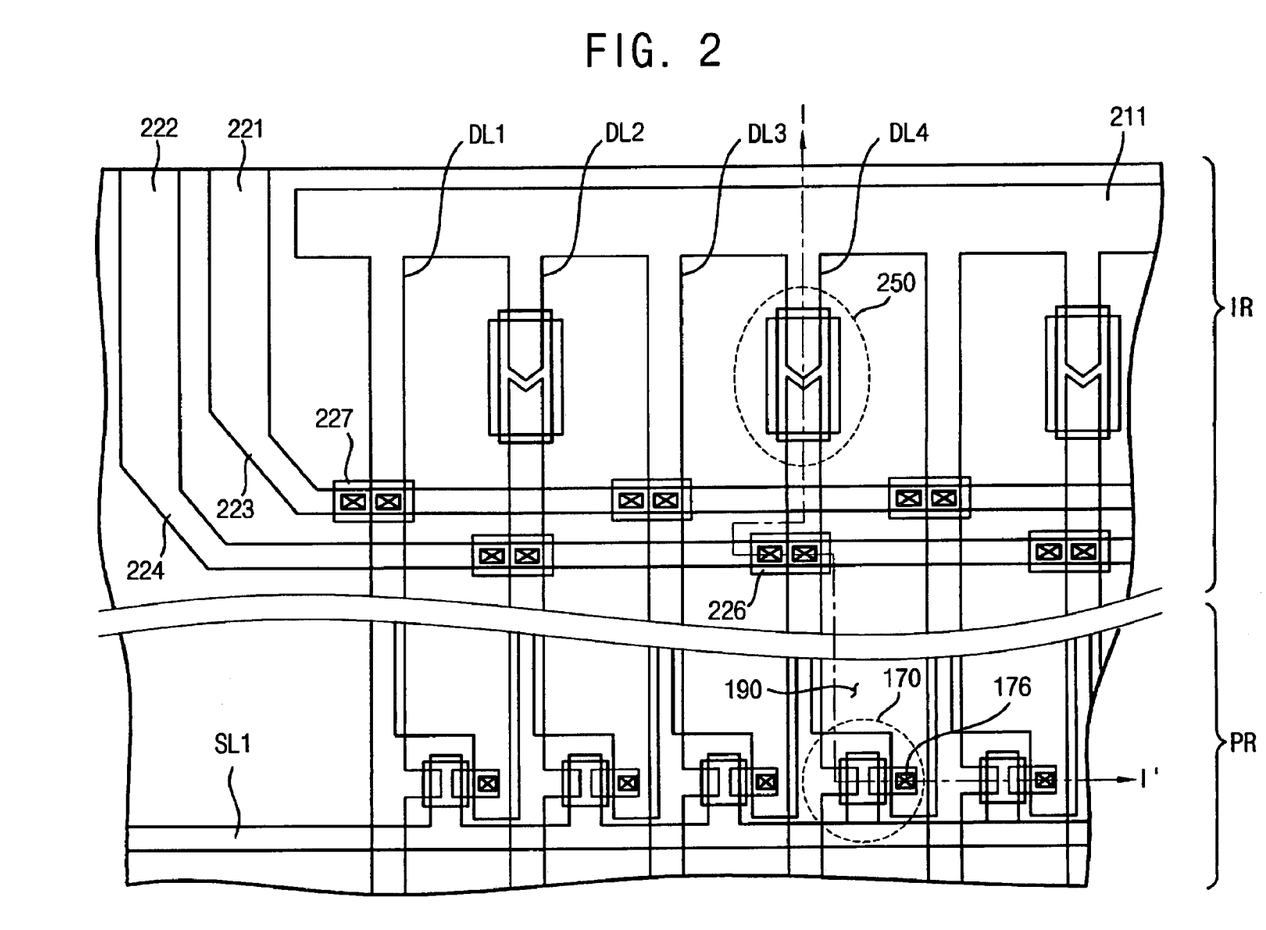
FIG. 2 is an enlarged plane view showing the substrate of FIG. 1.

FIG. 2 is an enlarged plane view showing a portion of the array substrate 110 of FIG. 1. Referring to FIGS. 1 and 2, the substrate includes the first area IR and the second area PR. The first array interface is arranged in the first area and applies a test signal to the data lines. The first array interface interfaces the test signal to the data lines. A pixel part is arranged in the second area PR and includes switching elements 170 and pixel electrodes 190. Each switching elements 170 is electrically connected to the corresponding data line and scan line. Each pixel electrodes 190 is electrically connected to the corresponding switching elements 170.

The first array test interface includes the first shorting bar 211, the data test pads 221 and 222, the data test lines 223 and 224 and the floating TFTs 250. The first shorting bar 211 is a single line and electrically connected to the data lines. The first shorting bar 211 is extended substantially in parallel with the scan lines. The first shorting bar 211 dissipates an electrostatic charge stored in the array substrate 100 into the data lines.

When the data test pads 221 and 222 are formed using the 2D method, the first data test pad 221 applies the first data test signal to the odd numbered data lines, and the second data test pad 222 applies the second data test signal to the even numbered data lines. The first data test line 223 transmits the first data test signal received from the first data test pad 221 to the odd numbered data lines DL1, DL3, . . . , DL2$p$−3 and DL2$p$−1 through first contact portions 227, respectively, wherein 'p' is a natural number. The second data test line 224 transmits the second data test signal received from the second data test pad 222 to the even numbered lines DL2, DL4, . . . , DL2$p$−2 and DL2$p$ through second contact portions 226, respectively.

The floating TFTs 250 are formed on the even numbered data lines DL2, DL4, . . . DL2$p$−2 and DL2$p$ between the first shorting bar 211 and the first and second data test lines 223 and 224. The floating TFTs 250 use portions of the even numbered data lines as their source/drain electrodes. Alternatively, the floating TFTs 250 may be formed on the odd numbered data lines DL1, DL3 . . . DL2$p$−3 and DL2$p$−1 using portions of the odd numbered data lines as their source/drain electrodes. The odd numbered data lines DL1, DL3, . . . DL2$p$−3 and DL2$p$−1 are electrically connected to the first shorting bar 211.

In an array test process, the first data test pad 221 and the first data test line 223 receive the first data test signal, and the second data test pad 222 and the second data test line 224 receive the second data test signal. Since the gate electrodes of the floating TFTs 250 are electrically floated, the first data test signal is not applied to the even numbered data lines DL2, DL4, . . . DL2p−2 and DL2p. The first data test signal is applied to the odd numbered data lines DL1, DL3, . . . DL2p−3 and DL2p−1 through the first data test line 221. In addition, the first data test signal is applied to the first shorting bar 211.

The second data test signal is applied to the even numbered data lines DL2, DL4, . . . DL2p−2 and DL2p through the second data test line 221. However, the second data test signal is not applied to the odd numbered data lines DL1, DL3, . . . DL2p−3 and DL2p−1 by the first floating TFTs 250. Therefore, the second data test signal is only applied to the even numbered data lines DL2, DL4, . . . DL2p−2 and DL2p. It is unnecessary to perform etching to electrically insulate the first shorting bar 211 from the data lines. Therefore, the 2D array test error that may be caused by the etching process is prevented.

Figure 3:
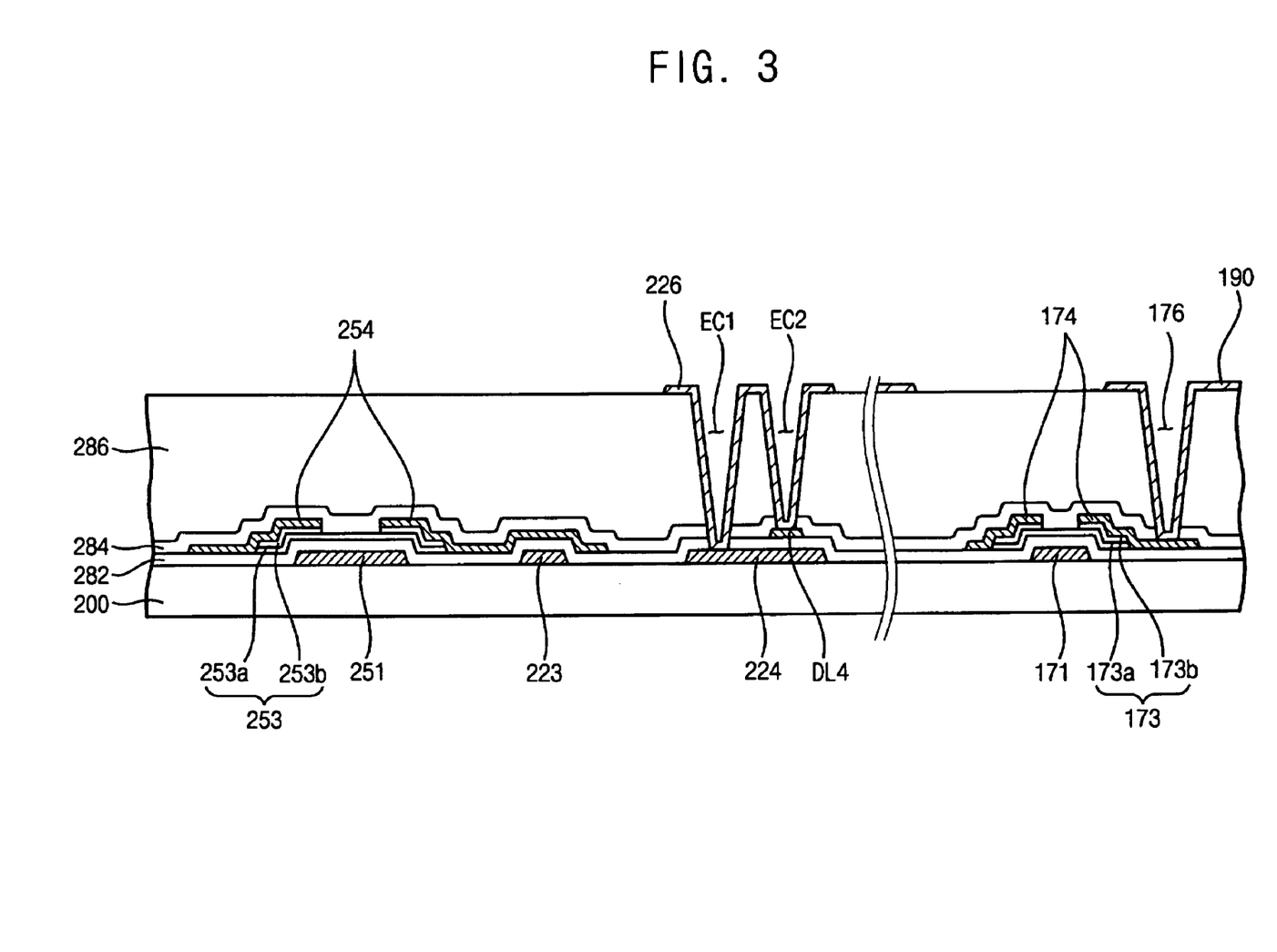
FIG. 3 is a cross-sectional view of FIG. 2 cut along line I-I'.

FIG. 3 is a cross-sectional view showing the array substrate 100, cut along line I-I' of FIG. 2. Referring to FIGS. 2 and 3, on a base substrate 200 (e.g. glass substrate), a gate electrode 251 for the floating TFTs 250, the first shorting line 221, the second shorting line 222 and a gate electrode 171 of the switching elements 170 are formed. The gate insulating layer 282 is formed thereon. Channel layer patterns 253 and 173 are formed on the gate electrode 251 of the floating TFTs 250 and the gate electrode 171 of the pixel switching element 170. The channel layer pattern 253 is formed on the gate electrode 251 of the floating TFT 250. The channel layer pattern 173 is formed on the gate electrode 171 of the switching elements 170. The channel layer patterns 253 and 173 are formed from the same layer. The channel layer patterns 253 and 173 include active layer patterns 253a and 173a and ohmic contact layer patterns 253b and 173b formed on the active layer patterns 253a and 173a, respectively.

Source and drain electrodes 254 of the floating TFTs 250, the data lines and source and drain electrodes 174 of the pixel switching element 170 are formed from the same conductive layer, and a passivation layer 284 is formed thereon. An insulating layer 286 is formed on the passivation layer 284, but may be omitted. The second data test line 224 is electrically connected to the even numbered data lines DL2, DL4, . . . DL2p−2 and DL2p via the second contact portions 226, respectively. The second contact portion 226 includes the first contact hole EC1, which partially exposes the second data test line 224, and a second contact hole EC2, which partially exposes one of the even numbered lines DL2, DL4, . . . DL2p−2 and DL2p. The drain electrode of the pixel switching element 170 is exposed through the third contact hole 176.

A transparent electrode 190 is electrically connected to the second data test line 224 via the first contact hole EC1, and the transparent electrode 190 is also electrically connected to the even numbered data lines DL2 via the second contact hole EC2. In addition, the transparent electrode 190 is electrically connected to the drain electrode of the pixel switching element 170 via the third contact hole 176.

Figure 4A:
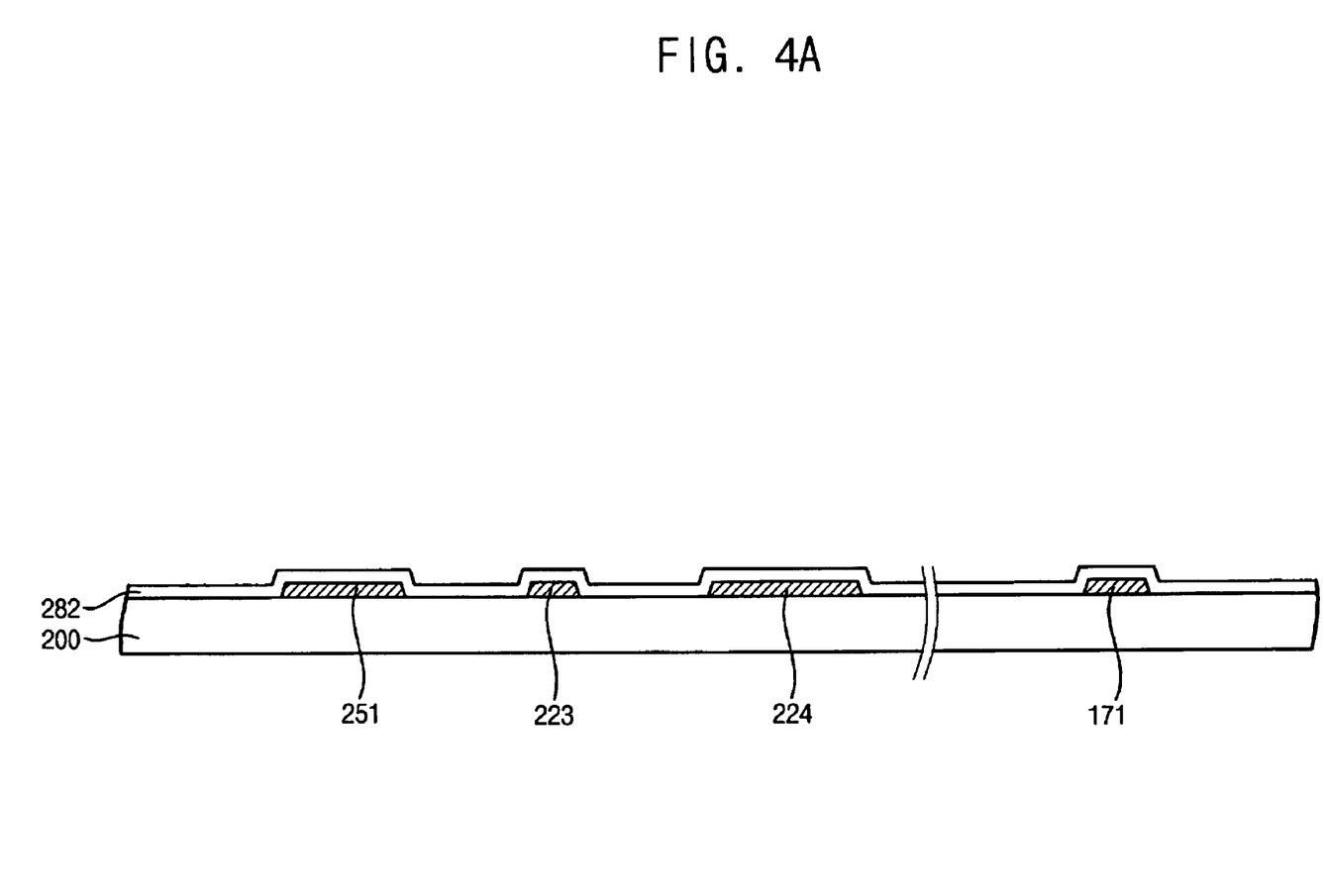
FIGS. 4A to 4D are cross-sectional views showing a method of manufacturing a mother substrate of FIG. 3.

FIGS. 4A to 4D are cross-sectional views showing a method of manufacturing a mother substrate of FIG. 3. Referring to FIG. 4A, the first conductive layer is formed on the base substrate 200 by deposition such as sputtering, chemical vapor deposition (CVD), etc. The conductive layer is formed of aluminum (Al), copper (Cu), etc. The conductive layer is patterned by photolithography to form the gate electrode 251 of the floating switching element 250, the first data test line 223, the second data test line 224 and the gate electrode 171 of the switching element 170. The gate insulating layer 282 is formed on the patterned first conductive layer to electrically insulate the patterned first conductive layer from the channel layer patterns. The gate insulating layer 282 may be formed by deposition. The gate insulating layer 282 is formed of an insulating material (e.g. silicon nitride, silicon oxide, etc.).

Figure 4B:
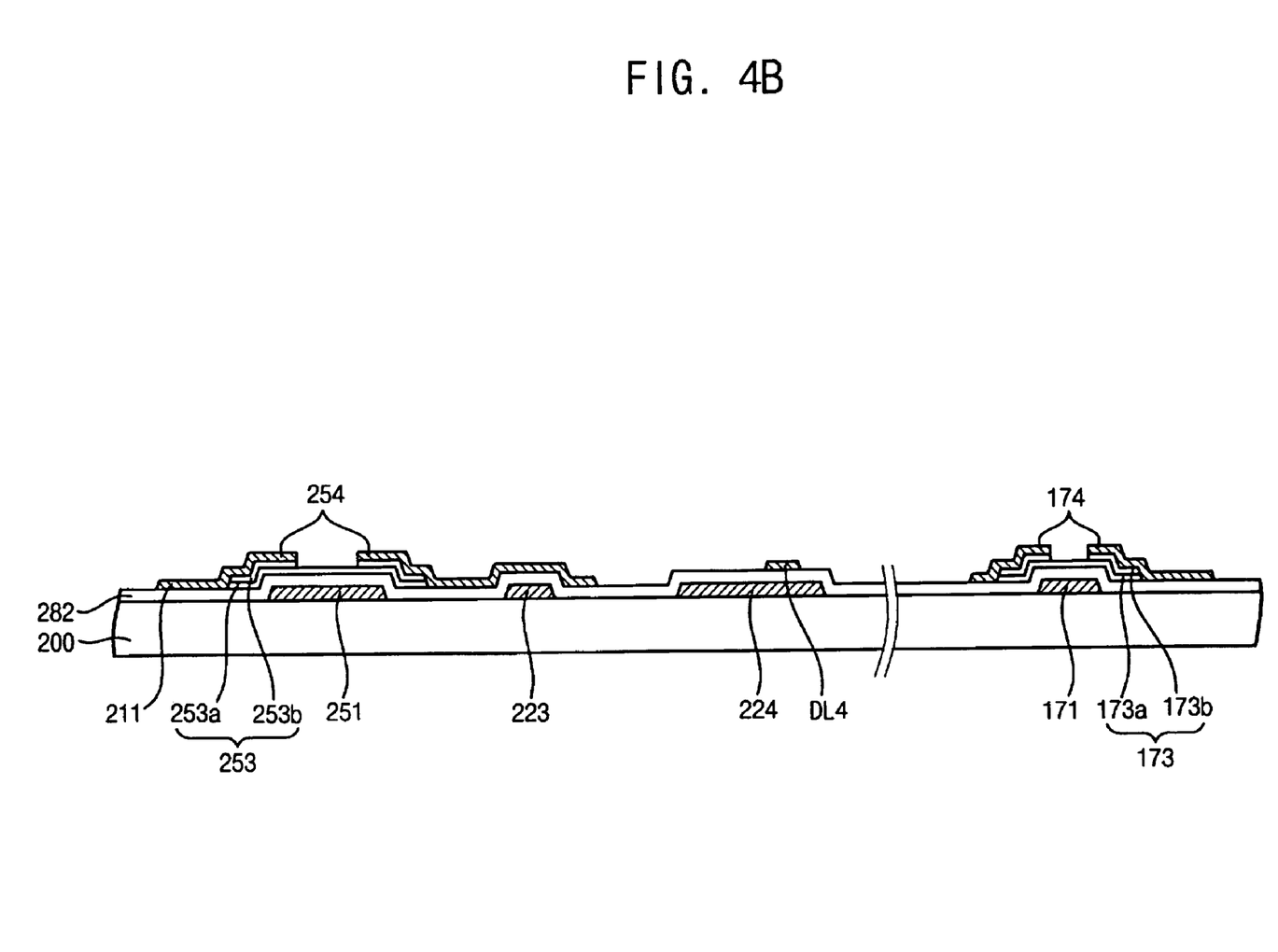

Referring to FIG. 4B, the active layer patterns 253a and 173a are formed on the gate insulating layer 282. The active layer patterns 253a and 173a may be semiconductor layer patterns. The active layer patterns 253a and 173a may also include amorphous silicon. The ohmic contact layer patterns 253b and 173b are formed on the active layer patterns 253a and 173a. The ohmic contact layer patterns 253b and 173b may be formed by implanting impurities. The ohmic contact layer patterns 253b and 173b may be formed of N+ amorphous silicon (a-Si:H). The active layer patterns 173a and 253a and the ohmic contact layer patterns 173b and 253b may be formed via photolithography. The active layer patterns 173a and 253a and the ohmic contact layer patterns 173b and 253b form the channel layer patterns 173 and 253 on the gate insulating layer 282 corresponding to the gate electrode 171 of the switching element 170 and the gate electrode 251 of each of the floating TFTs 250, respectively.

The second conductive layer is formed on the ohmic contact layer patterns 253b and 173b, and patterned to form the shorting bar 211, the source-drain electrode 254 of the floating TFT 250, the data lines, and the source/drain electrodes 174 of the switching element 170. The ohmic contact layer patterns 253b and 173b are partially etched by using the source and drain electrodes 254 and 174 as the etching mask. The channel layer patterns 253 and 173 are formed on the floating TFT 250 and the pixel switching element 170, respectively.

Figure 4C:
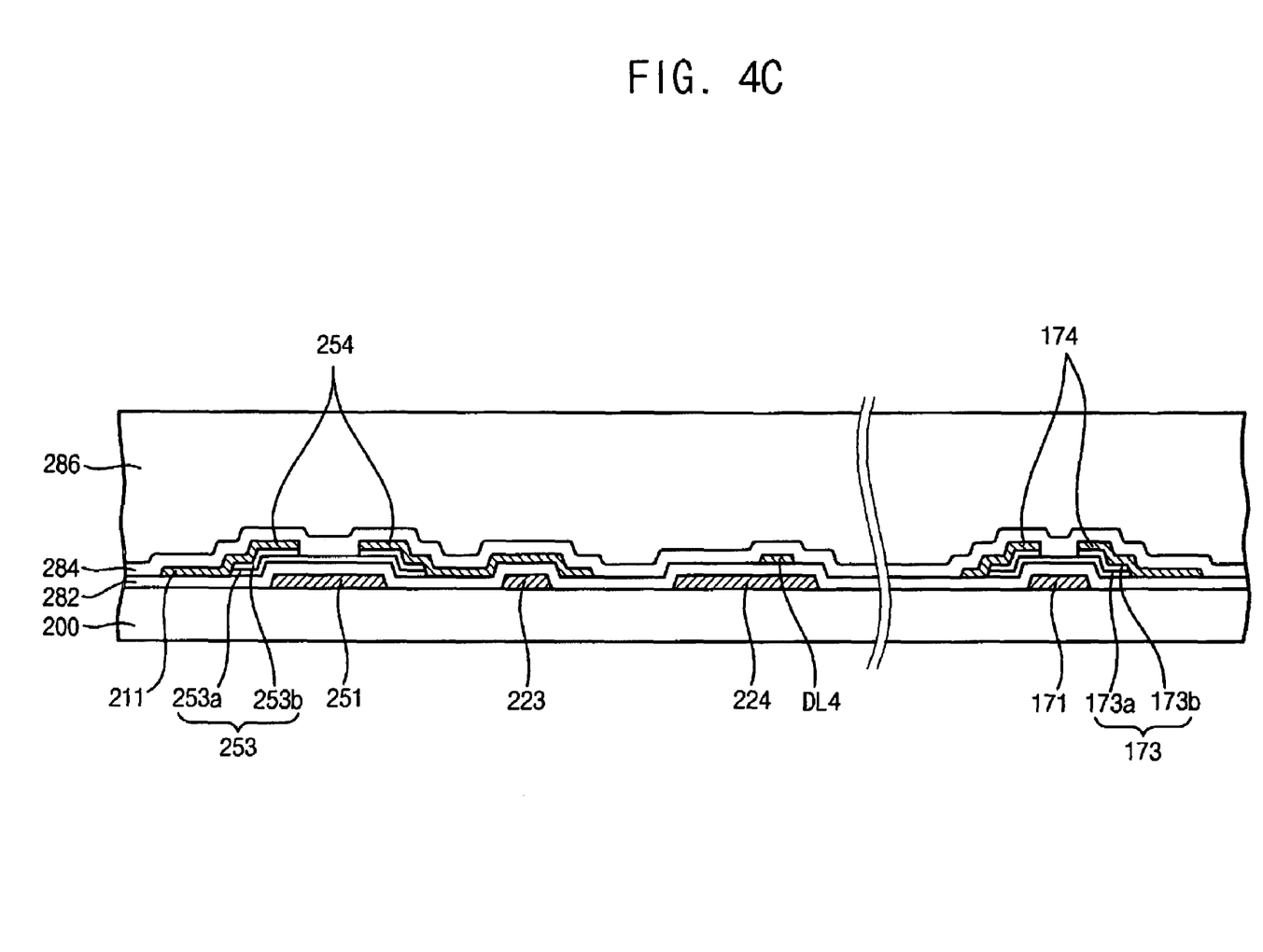

Referring to FIG. 4C, the insulating layer 286 is formed on the passivation layer 284. The insulating layer 284 may be omitted. The insulating layer 286 includes an inorganic insulating material such as silicon nitride, silicon oxide, etc. These materials can be used alone or in a combination thereof. The insulating layer 286 includes an organic insulating material having a low dielectric constant. The organic material may be acryl based organic compound, Teflon, benzocyclobutene (BCB), Cytop, perfluoro-cyclobutane (PFCB), etc. These materials can be used alone or in a combination thereof. The first, second and third contact holes EC1, EC2 and 176 are formed on the insulating layer 286 by the photolithography process.

Figure 4D:
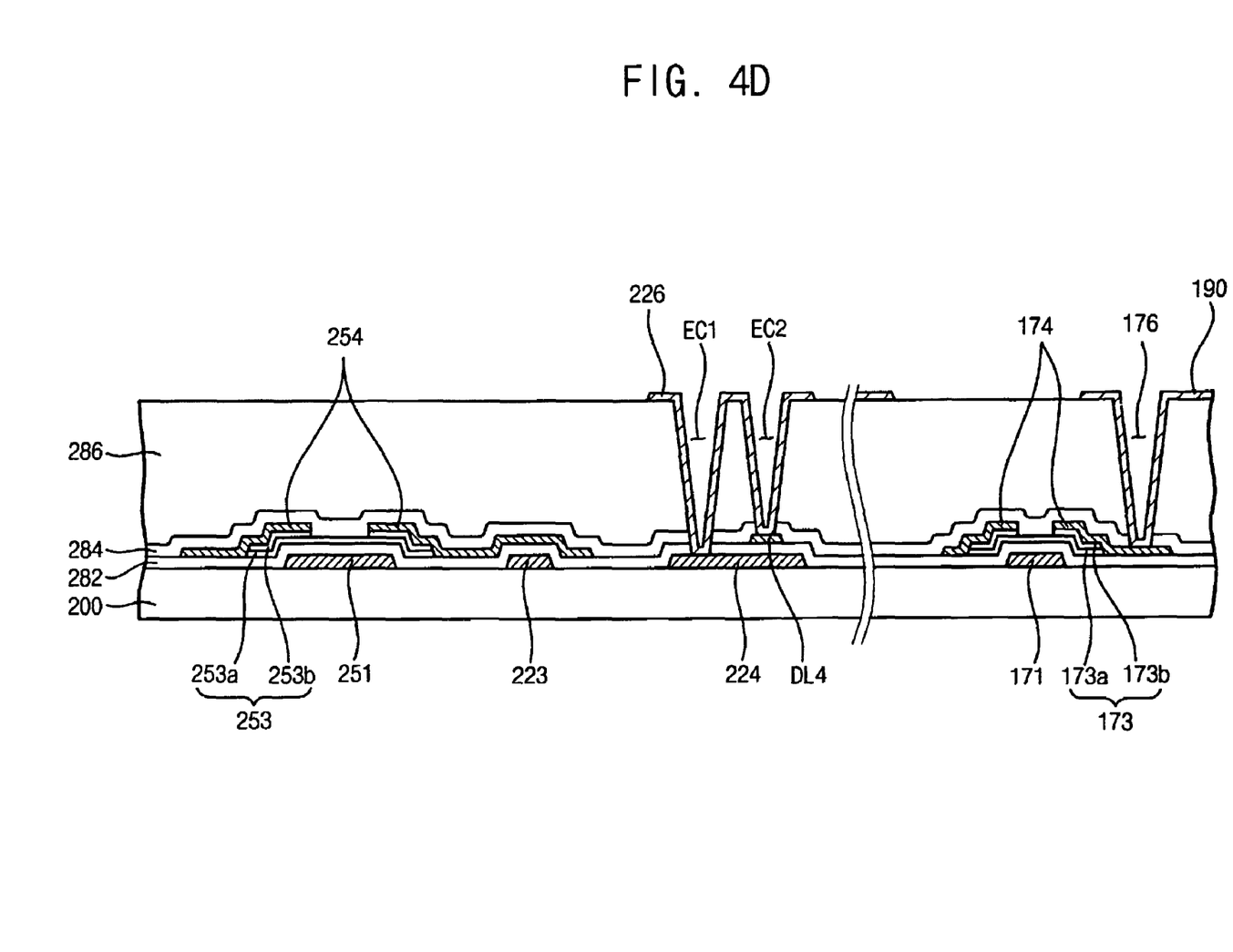

Referring to FIG. 4D, the first contact hole EC1 partially exposes the second line 222. The second contact hole EC2 partially exposes the even numbered line DL4. The third contact hole 176 partially exposes the drain electrode of the switching element 170. A transparent electrode layer is formed on the insulating layer 286. The transparent electrode layer is patterned to form a pixel electrode pattern. The pixel electrode pattern includes the second contact portion 226 and the pixel electrode 190. The transparent electrode layer includes Indium-Tin-Oxide (ITO), Indium-Zinc-Oxide (IZO), Indium-Tin-Zinc-Oxide (ITZO), etc.

The second data test line 224 is electrically connected to the even numbered data line DL4 through the second contact portion 226 formed on the first and second contact holes EC1 and EC2. The pixel electrode 190 is electrically connected to the drain electrode 174 of the pixel switching element 170 through the third contact hole 176. The floating TFTs 250 and the switching elements 170 have an inverted-staggered structure, in which the source-drain electrode is over the gate electrode.

Figure 5:
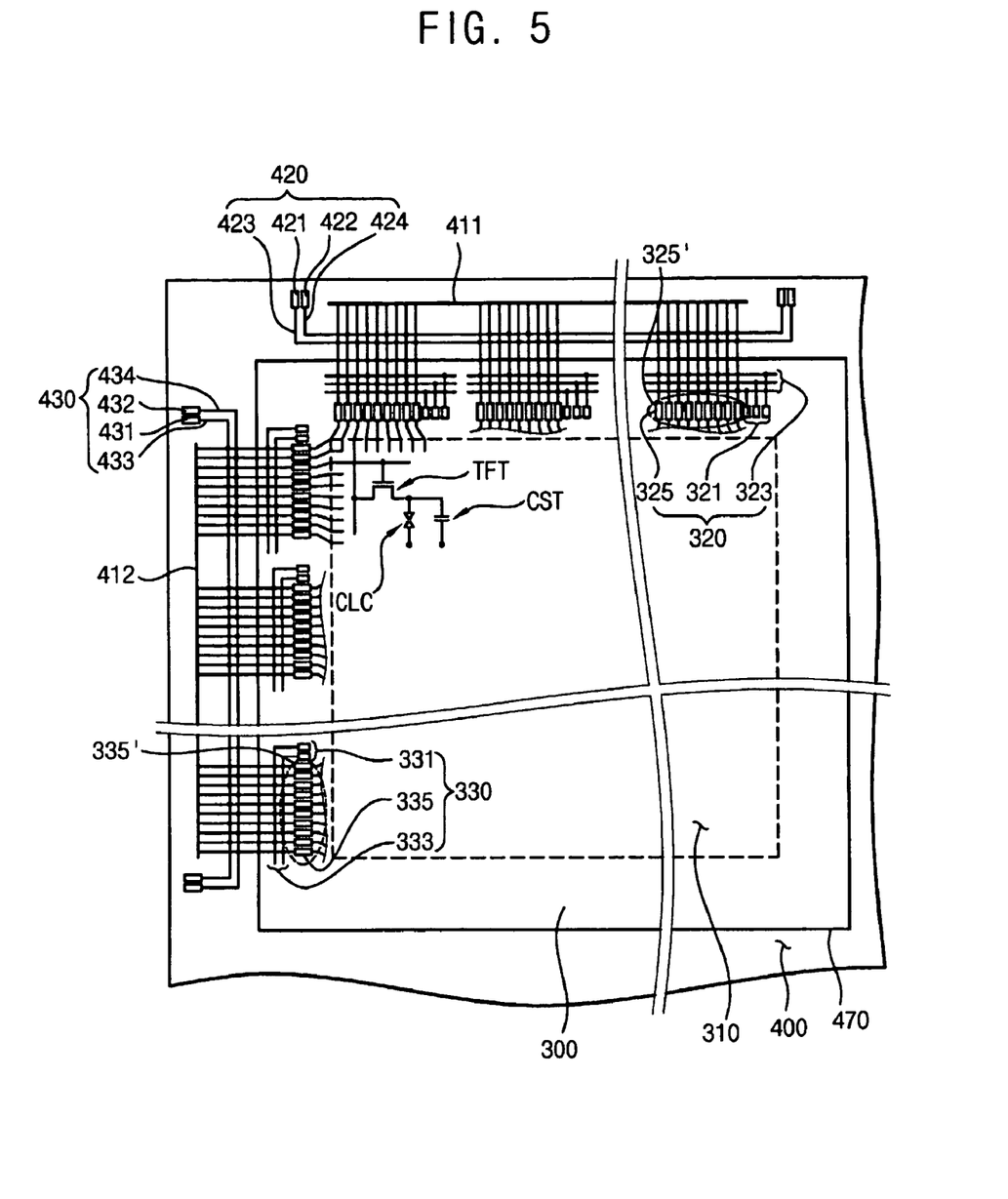
FIG. 5 is a plane view illustrating a substrate for a display panel according to another embodiment of the present invention.

FIG. 5 is a plane view illustrating a substrate for a display panel according to another embodiment of the present invention. On the array substrate 300, the first shorting bar 411, the second shorting bar 412, the first array test part 420, the second array test part 430 and the scribe line 470 are formed. A mother substrate may include more than one array substrates 300. The array substrate 300 includes a pixel region 310, a first V/I part 320 and a second V/I part 330.

The first V/I part 320 includes the first V/I pads 321, the first V/I lines 323 and the first drive chip pads 325. The first driver chip is arranged on the first driver chip pads 325. The data lines are grouped as the first driver chip pad assembly 325'. Alternatively, the data lines may be divided into a plurality of first driver chip pad assemblies 325'. The first driver chip pad assembly 325' is electrically connected to the first V/I pad 321 and the first V/I line 323. The first V/I pads 321 include the first V/I data pad, the second V/I data pad, and the third V/I data pad for a 3D method, in which the first, second and third V/I data pads are connected to the (3n−2)th data lines, the (3n−1)th data lines and the (3n)th data lines, respectively, wherein 'n' is a natural number.

The second V/I part 330 includes the second V/I pads 331, the second V/I lines 333 and the second drive chip pads 335. The second driver chip is formed on the second driver chip pad 335. The data lines are grouped as the second driver chip pad assembly 335'. Alternatively, the data lines may be divided into a plurality of the second driver chip pad assemblies 335'.

The second driver chip pad assembly 335' is electrically connected to the second V/I pads 331 and the second V/I lines 333. The second V/I pads 331 includes the first V/I scan pad and the second V/I scan pad for a 2G method, in which the first V/I scan pad and the second V/I scan pad are electrically connected to the (2n−2)th scan lines and the (2n)th scan lines, respectively, wherein 'n' is a natural number.

The first shorting bar 411 is electrically connected to the data lines to dissipate an electrostatic charge stored in the array substrate 300 via the data lines. The first shorting bar 411 is a single line on a peripheral portion of the array substrate 300. The second shorting bar 412 is electrically connected to the scan lines to dissipate the electrostatic charge stored in the array substrate via the scan lines. The second shorting bar 412 is a single line on the peripheral portion of the array substrate 300.

The first array test part 420 applies the first data test signal and the second data test signal to the data lines. The first array test part 420 includes the first data test pad 421, the second data test pad 422, the first data test line 423, the second data test line 424 and a plurality of first floating TFTs. The first data test pad 421 applies the first data test signal to the odd numbered data lines via the first data test line 423. The second data test pad 422 applies the second data test signal to the even numbered data lines via the second data test line 424.

The first floating TFTs are formed on the first signal lines between the first shorting bar 411 and the first array test part 420. In this embodiment, the first floating TFTs are arranged on the even numbered data lines between the first and second data test lines 423 and 424 and the first shorting bar 411. Alternatively, the first floating TFTs may be formed on the odd numbered data lines.

The first floating TFTs blocks the first data test signal such that the first data test signal is not applied to the even numbered data lines. The even numbered data lines are electrically disconnected from the first shorting bar 411 by the first floating TFTs. Therefore, an etching process for electrically insulating the first shorting bar 411 from the data lines is unnecessary. Thus, the array test error that may be caused by the etching process is prevented. Further, the manufacturing process is simplified and the manufacturing cost is reduced.

The second array test part 430 applies scan test signals to the scan lines formed on the array substrate 300. The second array test part 430 includes the first scan test pad 431, the second test pad 432, the first scan test line 433, the second test line 434 and a plurality of second floating TFTs. The first scan test pad 431 applies the first scan test signal to odd numbered scan lines via the first scan test line 433. The second scan test pad 432 applies the second scan test signal to even numbered scan lines via the second scan test line 434.

The second floating TFTs are on the even numbered scan lines between the first and second scan test lines 433 and 434 and the second shorting bar 412. Alternatively, the second floating TFTs may be formed on the odd numbered scan lines. The second floating TFTs block the first scan test signal such that the first scan test signal is not applied to the even numbered scan lines. An etching process for electrically insulating the second shorting bar 412 from the scan lines is unnecessary. Therefore, the array test error that may be generated by the etching process is prevented.

Figure 6:
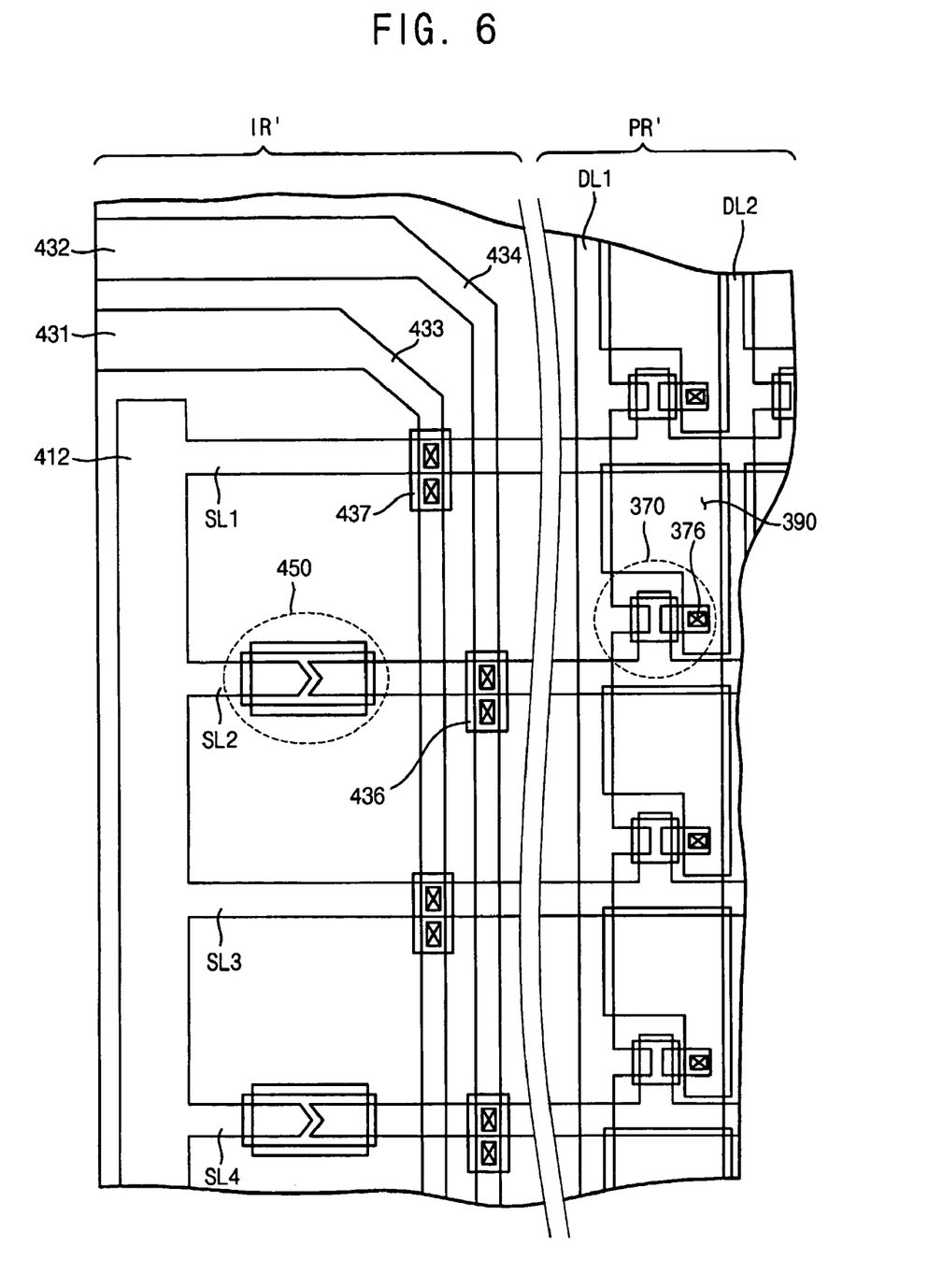
FIG. 6 is an enlarged plane view showing the substrate of FIG. 5.

FIG. 6 is an enlarged plane view showing the array substrate 300 of FIG. 5. The substrate includes the first array test part. The first array test part applies the first and second data test signals to the data lines. The first array test part of FIG. 6 is the same as in FIG. 2. Thus, any further explanation concerning the above elements will be omitted. The substrate 400 includes the first area IR' and the second area PR'. The second array interface is arranged in the first area IR' and applies the first and second scan test signals to the scan lines. A pixel part is arranged in the second area PR' and includes a plurality of switching elements 370 and a plurality of pixel electrodes 390'. The switching elements 370 are electrically connected to the corresponding data lines and the scan lines. The pixel electrodes 390 are electrically connected to the corresponding pixel switching elements 370, respectively. T The second array test interface includes the second shorting bar 412, the first and second scan test pads 431 and 432, the first and second scan test lines 433 and 434 and the second floating TFTs 450. The second shorting bar 412 is a single line and electrically connected to the scan lines. The second shorting bar 412 dissipates an electrostatic charge stored in an array substrate 300 via the scan lines.

In the 2G method, the scan test pads include the first and second scan test pads 431 and 432. The first scan test pad 431 applies the first scan test signal to the odd numbered scan lines SL1, SL3, ... SL2q−3 and SL2q−1. The second scan test pad 432 applies the second scan test signal to the even numbered scan lines SL2, SL4, ... SL2q−2 and SL2q. In the 2D method, the scan test lines include the first scan test line 433 and the second scan test line 434. The first scan test line 433 transmits the first scan test signal from the first scan test pad 431 to the odd numbered scan lines SL1, SL3, ... SL2q−3 and SL2q−1 through first contact portions 427, respectively, wherein 'q' is a natural number. The second scan test line 434 transmits the second scan test signal from the second scan test pad 432 to the even numbered lines SL2, SL4, ... SL2q−2 and SL2q through second contact portions 426, respectively. The first scan test line 433 is electrically connected to the odd numbered scan lines SL1, SL3, ... SL2q−3 and SL2q−1 through the first portions 427, respectively. The second scan test line 434 is electrically connected to the even numbered scan lines SL2, SL4, ... SL2q−2 and SL2q through the second portions 426, respectively.

The second floating TFTs 450 are formed on the even numbered scan lines SL2, SL4, ... SL2q−2 and SL2q between the second shorting bar 412 and the first and second scan test lines 433 and 434. The floating TFTs 450 and the pixel switching elements 370 may have the staggered structure. Alternatively, the second floating TFTs 450 may be formed on the odd numbered scan lines SL1, SL3, . . . SL2$q$–3 and SL2$q$–1 using portions of the odd numbered scan lines SL1, SL3, . . . SL2$q$–3 and SL2$q$–1 as the source-drain electrodes. The odd numbered scan lines SL1, SL3, . . . SL2$q$–3 and SL2$q$–1 are electrically connected to the second shorting bar 412.

In an array test process, the first scan test pad 431 electrically connected to the first scan test line 433 applies the first scan test signal to the odd numbered scan lines SL1, SL3, . . . SL2$q$–3 and SL2$q$–1. The second scan test pad 432 electrically connected to the second scan test line 434 applies the second scan test signal to the even numbered scan lines SL2, SL4, . . . SL2$q$–2 and SL2$q$. The gate electrodes of the floating TFTs 450 are electrically floated, so that the first scan test signal is not applied to the even numbered scan lines SL2, SL4, . . . SL2$q$–2 and SL2$q$ via the second shorting bar 412.

The first scan test signal is applied to the odd numbered scan lines SL1, SL3, . . . SL2$q$–3 and SL2$q$–1 through the first scan test line 433. In addition, the first scan test signal is applied to the second shorting bar 412. The second scan test signal is applied to the even numbered scan lines SL2, SL4, . . . SL2$q$–2 and SL2$q$ through the second scan test line 432. The floating TFTs 450 control the second scan test signal. In the substrate of FIG. 5, the floating TFTs 450 block the second scan test signal so that the second scan test signal is not applied to the odd numbered lines SL1, SL3, . . . SL2$q$–3 and SL2$q$–1. The odd numbered lines SL1, SL3, . . . SL2$q$–3 and SL2$q$–1 are electrically disconnected from the second shorting bar 412 by the floating TFTs 450. Therefore, the second scan test signal is only applied to the even numbered scan lines SL2, SL4, . . . SL2$q$–2 and SL2$q$.

An etching process for electrically insulating the second shorting bar 412 from the scan lines is unnecessary. Therefore, the 2G array test error that may be caused by the etching process is prevented.

Figure 7A:
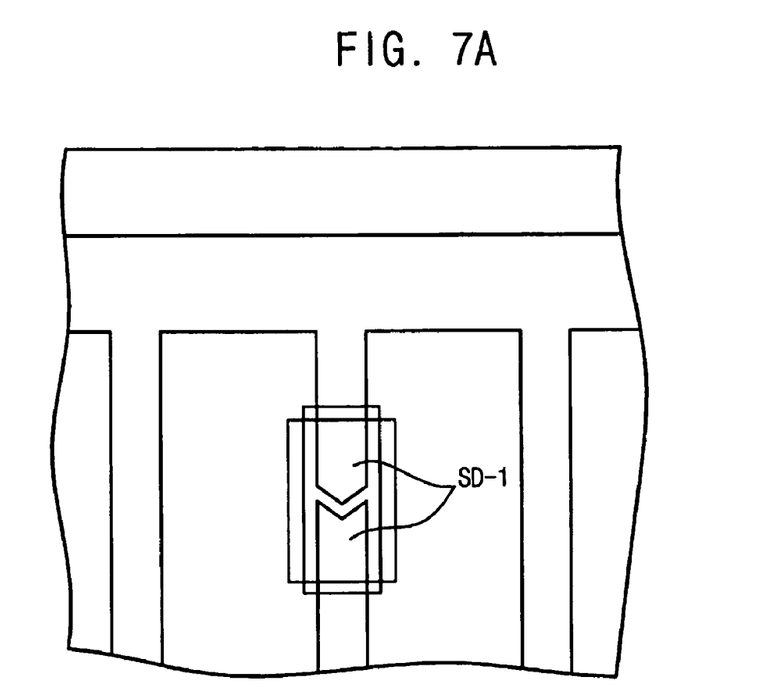
FIGS. 7A to 7C are plane views showing a floating TFT of various shapes according to another embodiments of the present invention.

FIG. 7A is a plane view illustrating a floating TFT according to another embodiment of the present invention. The floating TFT includes a source electrode and a drain electrode. One of the source and drain electrodes has a V shape when viewed from above and has a protruded center. The other one has an inverse-V shape when viewed from above and has a recessed center. Therefore, the end portion of the source electrode is spaced apart from the end portion of the drain electrode by a constant distance so that the end portion of the source electrode corresponds to the end portion of the drain electrode.

Figure 7B:
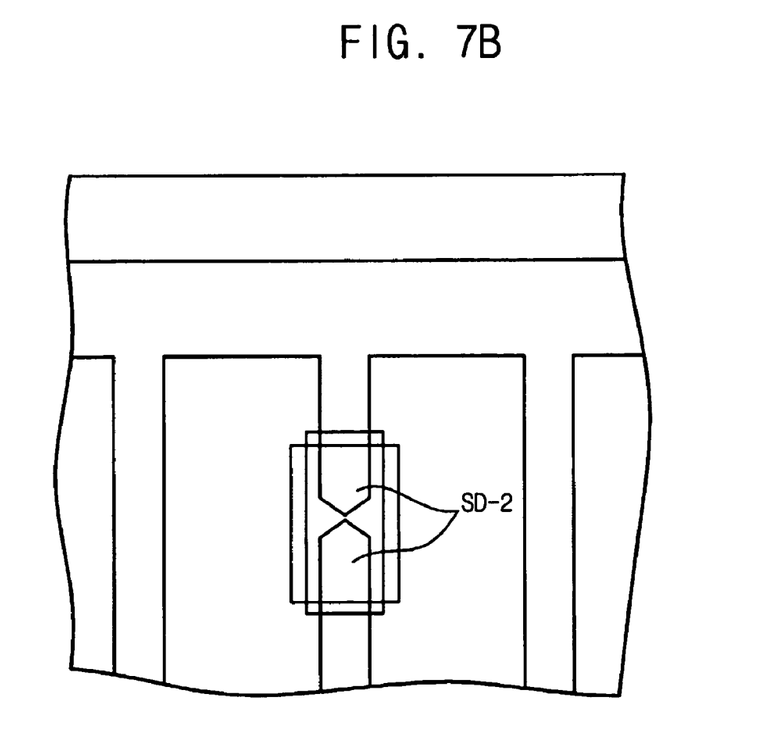

FIG. 7B is a plane view illustrating a floating TFT according to another embodiment of the present invention. Referring to FIG. 7B, the floating TFT includes a source electrode and a drain electrode. The end portions of the source and drain electrodes have a V shape with a protruded center. Therefore, the protruded centers of the source and drain electrodes correspond to each other.

Figure 7C:
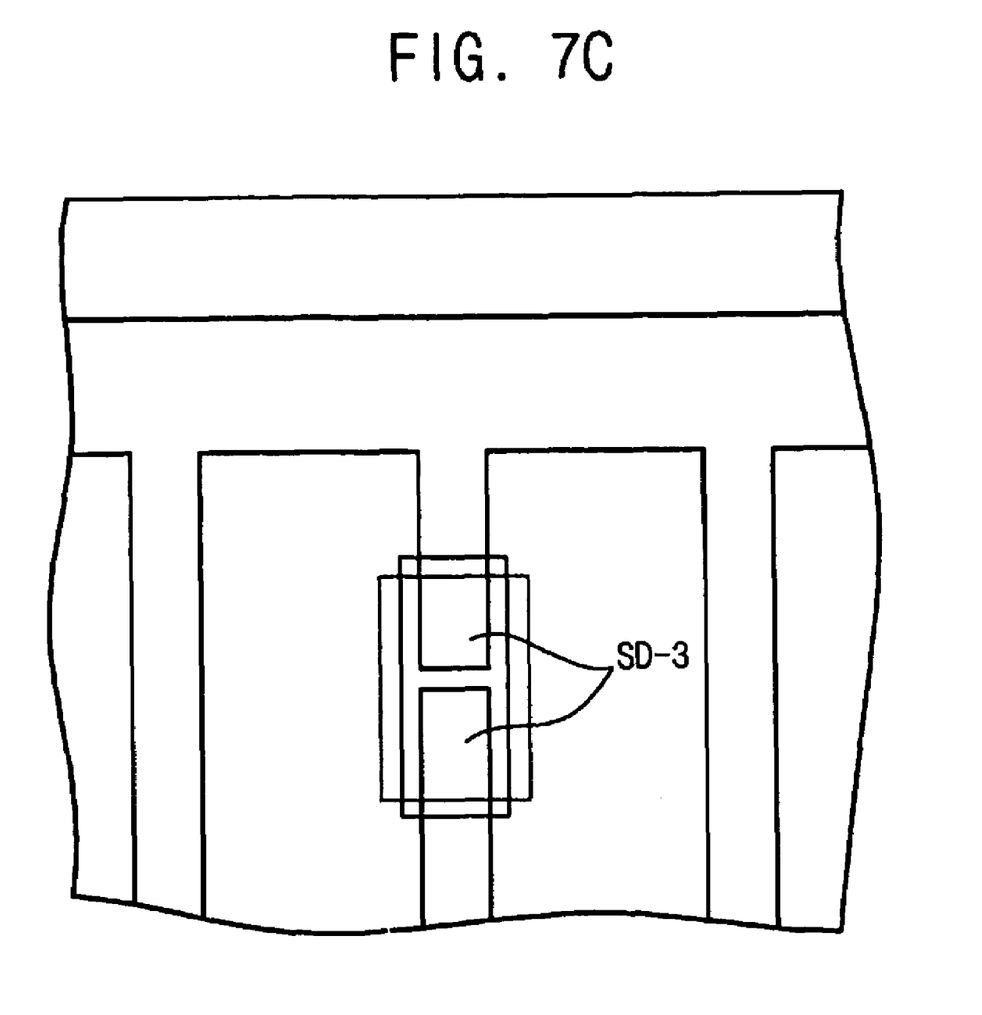

FIG. 7C is plane view illustrating a floating TFT according to another embodiment of the present invention. Referring to FIG. 7C, the floating TFT includes a source electrode and a drain electrode. Each of end portions of the source and drain electrode has a flat shape. Alternatively, the floating TFT may have various shapes.

According the panel for the display panel and the method of manufacturing the panel, the floating TFTs are formed on the even numbered data lines (or odd numbered data lines) using the 2D method so that the data test signal is applied to the odd numbered data lines and is not applied to the even numbered data lines.

In addition, the floating TFTs are formed on the even numbered scan lines (or odd numbered scan lines) using the 2G method so that the scan test signal is applied to the odd numbered scan lines and is not applied to the even numbered scan lines, although the even numbered scan lines adjacent to the shorting bar are not opened. Therefore, the array test process is simplified. In addition, the etching process for electrically insulating the shorting bar from the data lines (or the scan lines) is unnecessary. Therefore, the 2D (or 2G) array test error that may be caused by the etching process is prevented. The test for detecting an open circuit or a short circuit may be performed by every two lines that may be the odd numbered lines or the even numbered lines.

This invention has been described with reference to the exemplary embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A panel for a display device, comprising:
   a substrate;
   a plurality of first signal lines formed on the substrate and extended in a first direction;
   a first shorting bar formed on the substrate corresponding to end portions of the first signal lines, extended in a second direction and dissipating an electrostatic charge;
   a first array test part extended in the second direction and applying a first test signal to odd numbered first signal lines and a second test signal to even numbered first signal lines; and
   a plurality of first floating switching elements formed on first alternating ones of the first signal lines between the first shorting bar and the first array test part, the first floating switching elements electrically disconnecting the first shorting bar from the first alternating ones of the first signal lines so that second alternating ones of the first signal lines are electrically connected to the first shorting bar,
   wherein the first signal lines are data lines.

2. The panel of claim 1, wherein the first floating switching elements are formed on the odd numbered first signal lines, respectively.

3. The panel of claim 1, wherein the first floating switching elements are formed on the even numbered first signal lines, respectively.

4. The panel of claim 1, wherein the first array test part comprises:
   a first line electrically connected to the odd numbered first signal lines;
   a first pad electrically connected to the first line, the first test signal being applied to the first line through the first pad;
   a second line electrically connected to the even numbered first signal lines; and
   a second pad electrically connected to the second line, the second test signal being applied to the second line through the second pad.

5. The panel of claim 4, wherein the first line comprises a plurality of first contact portions electrically connected to the odd numbered first signal lines, respectively, and the second line comprises a plurality of second contact portions electrically connected to the even numbered first signal lines, respectively.

6. The panel of claim 1 wherein the data lines are extended in the first direction, and the panel further comprises:

a plurality of scan lines extended in the second direction; and a plurality of switching elements electrically connected to the data lines and the scan lines.

7. The panel of claim 1, wherein the first floating switching elements have an inverted-staggered structure.

8. The panel of claim 1, further comprising: a plurality of second signal lines formed on the substrate and extended in the second direction;
a second shorting bar formed corresponding to end portions of the second signal lines, extended in the first direction and dissipating an electrostatic charge;
a second array test part extended in the first direction and applying a third test signal to odd numbered second signal lines and applying a fourth test signal to even numbered second signal lines; and
a plurality of second floating switching elements formed on the second signal lines between the second shorting bar and the second array test part, and electrically disconnecting the second shorting bar from the second signal lines.

9. The panel of claim 8, wherein the second floating switching elements are formed on the odd numbered second signal lines, respectively.

10. The panel of claim 8, wherein the second floating switching elements are formed on the even numbered second signal lines, respectively.

11. The panel of claim 8, wherein the second array test part comprises:
a third line electrically connected to the odd numbered second signal lines;
a third pad electrically connected to the third line, the third test signal being applied to the third line through the third pad;
a fourth line electrically connected to the even numbered second signal lines; and
a fourth pad electrically connected to the fourth line, the fourth test signal being applied to the fourth line through the fourth pad.

12. The panel of claim 11, wherein the third line comprises a plurality of first contact portions electrically connected to the odd numbered second signal lines, respectively, and the fourth line comprises a plurality of second contact portions electrically connected to the even numbered second signal lines, respectively.

13. The panel of claim 8, wherein the second signal lines are the scan lines, respectively.

14. The panel of claim 8, wherein the second floating switching elements have a staggered structure.

15. A method of manufacturing a panel for a display device, the method comprising:
forming a first conductive pattern on a substrate, the first conductive pattern comprising a gate electrode, a first testing line, a second testing line, wherein the gate electrode is electrically floating;
forming a first insulation layer on the first conductive pattern;
forming a second conductive pattern on the first insulation layer, the second conductive pattern comprising a first shorting bar, a source electrode connected to the first shorting bar, a drain electrode, an even or an odd data line connected to the drain electrode, wherein the gate electrode, the source electrode and the drain electrode form a transistor that is formed only between the first shorting bar and a first alternating one of the even or odd data line thereby electrically disconnecting the first shorting bar from the first alternating one of the even or the odd data line so that a second alternating one of the even or odd data line is electrically connected to the first shorting bar;
forming a second insulating layer over the second conductive pattern;
forming a first contact hole via the first insulation layer and the second insulation layer to expose the first shorting bar;
forming a second contact hole via the second insulation layer to expose a second alternating one of the data line; and
forming a third conductive pattern on the second insulating layer, the third conductive pattern comprising a contact portion electrically interconnecting the second testing line and the second alternating one of the data line via the first contact hole and the second contact hole.

16. A method of manufacturing a panel for a display device, the method comprising:
forming a first conductive pattern on a substrate, the first conductive pattern comprising a first shorting bar, a plurality of gate lines, a first testing bar and a second testing bar, a plurality of first gate electrodes connected to the plurality of gate lines, and a plurality of second gate electrodes electrically floating;
forming a first insulation layer on the first conductive pattern;
forming a second conductive pattern on the first insulation layer, the second conductive pattern comprising a second shorting bar, a plurality of data lines divided into a first data line group and a second data line group, a plurality of first source and drain electrode pairs corresponding to the first gate electrodes and a plurality of second source and drain electrode pairs corresponding to the second gate electrodes, wherein each second source and drain electrode pair is coupled only between the second shorting bar and the data lines of the second data line group thereby electrically disconnecting the second shorting bar with the data lines of the second data line group so that the data lines of the first data line group is electrically connected to the second shorting bar, wherein the data lines of the second data line group alternate with the data lines of the first data line group;
forming a second insulation layer on the second conductive pattern;
forming a plurality of first contact holes exposing the first testing bar via the first insulation layer and the second insulation layer, a plurality of second contact holes exposing the second testing bar via the first insulation layer and the second insulation layer, a plurality of third contact holes exposing the data lines of the first data line group via the second insulation layer, and a plurality of fourth contact holes exposing the data lines of the second data line group; and
forming a third conductive pattern on the second insulation layer, the third conductive pattern comprising a plurality of first contact portions electrically interconnecting the first testing bar and the data lines of the first data line group, respectively, via the first contact holes and the third contact holes, and a plurality of second contact portions electrically interconnecting the second testing bar and the data lines of the second data line group, respectively, via the second contact holes and the fourth contact holes.

17. The method of claim 16, further comprising a step of forming a semiconductor pattern on the first insulation layer, the semiconductor pattern comprising a first semiconductor pattern overlapping the first gate electrodes and second semiconductor pattern overlapping the second gate electrodes.

18. The method of claim 16, wherein the third conductive pattern further comprises a plurality of pixel electrodes.

19. The method of claim 18, wherein the second insulation layer further comprises a plurality of fifth contact holes exposing the first drain electrodes, and the pixel electrodes are electrically connected to the first drain electrodes via the fifth contact holes.

20. A panel, comprising:
   a shorting bar;
   a first testing bar;
   a second testing bar;
   a plurality of signal lines divided into a first signal line group electrically connected to the first testing bar and the shorting bar, and a second signal line group electrically connected to the second testing bar; and
   a plurality of floating transistors formed between the shorting bar and the signal lines of the second signal line group to electrically disconnect the shorting bar from the signal lines of the second signal line group,
   wherein the signal lines are data lines.

21. A panel for a display device, comprising:
   a substrate;
   a plurality of first signal lines formed on the substrate and extended in a first direction;
   a first shorting bar formed on the substrate corresponding to end portions of the first signal lines, extended in a second direction and dissipating an electrostatic charge;
   a first array test part extended in the second direction and applying a first test signal to odd numbered first signal lines and a second test signal to even numbered first signal lines; and
   a plurality of first floating switching elements formed on first alternating ones of the first signal lines between the first shorting bar and the first array test part, the first floating switching elements electrically disconnecting the first shorting bar from first alternating ones of the first signal lines so that second alternating ones of the first signal lines are electrically connected to the first shorting bar,
   wherein the first signal lines are scan lines.

22. A panel, comprising:
   a shorting bar;
   a first testing bar;
   a second testing bar;
   a plurality of signal lines divided into a first signal line group electrically connected to the first testing bar and the shorting bar, and a second signal line group electrically connected to the second testing bar; and
   a plurality of floating transistors formed between the shorting bar and the signal lines of the second signal line group to electrically disconnect the shorting bar from the signal lines of the second signal line group,
   wherein the signal lines are scan lines.

* * * * *